May 18, 1937.   H. B. LOEWER   2,080,615
FRICTION SHOCK ABSORBING MECHANISM
Filed May 22, 1935   2 Sheets-Sheet 1
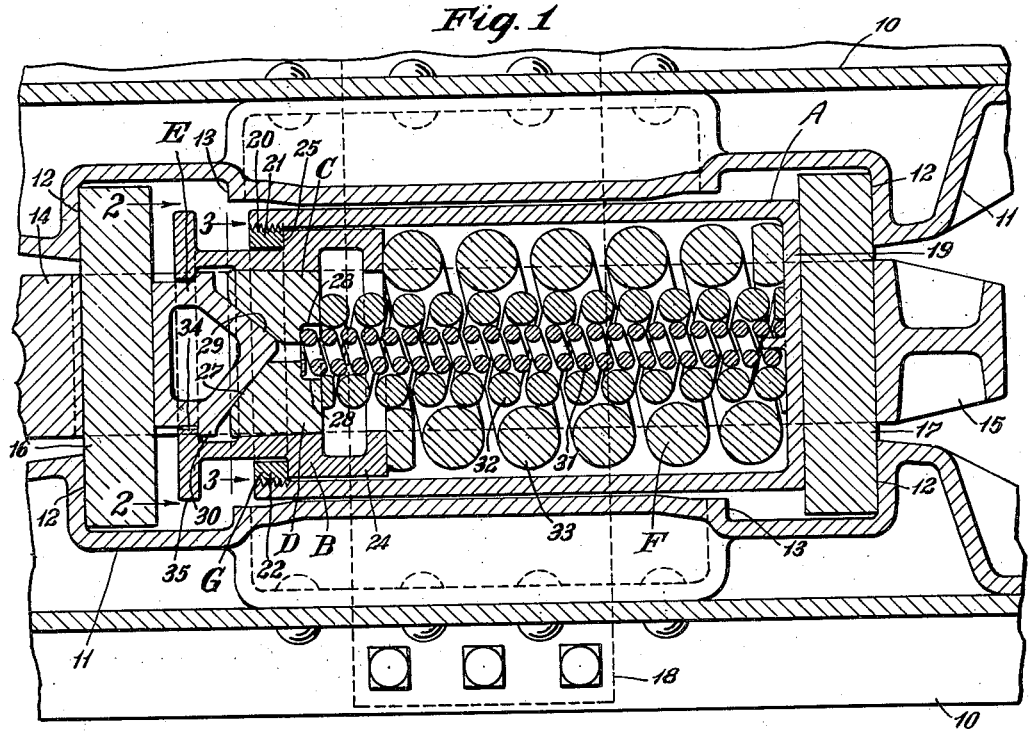
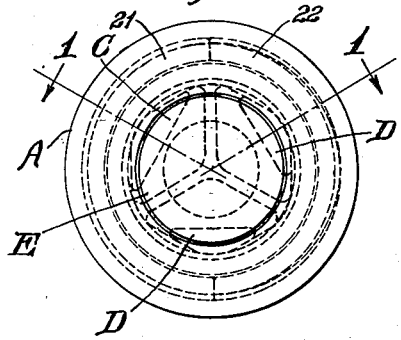 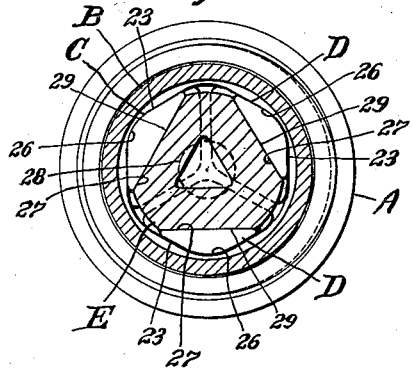
Inventor
Henry B. Loewer
By Henry Fuchs
Atty.

May 18, 1937. H. B. LOEWER 2,080,615
FRICTION SHOCK ABSORBING MECHANISM
Filed May 22, 1935 2 Sheets-Sheet 2
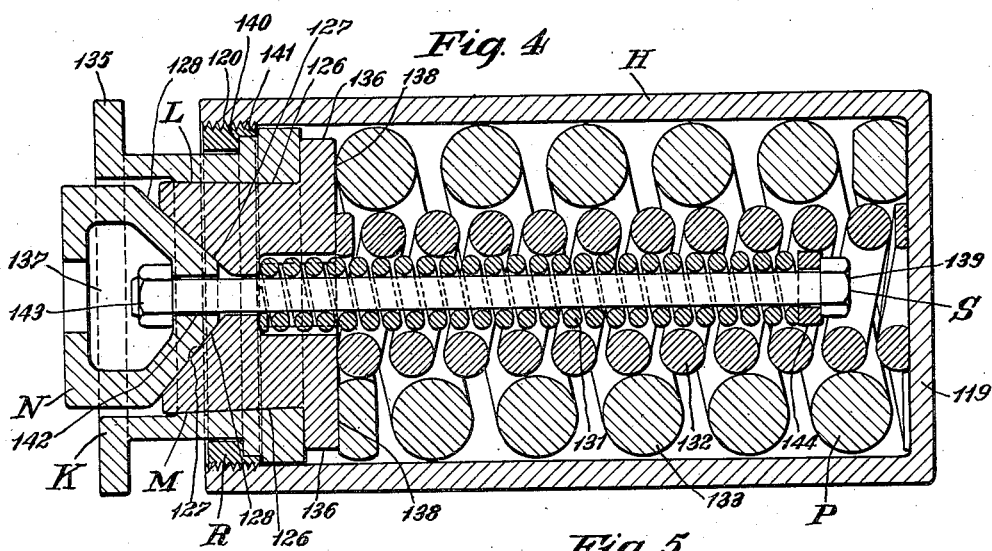
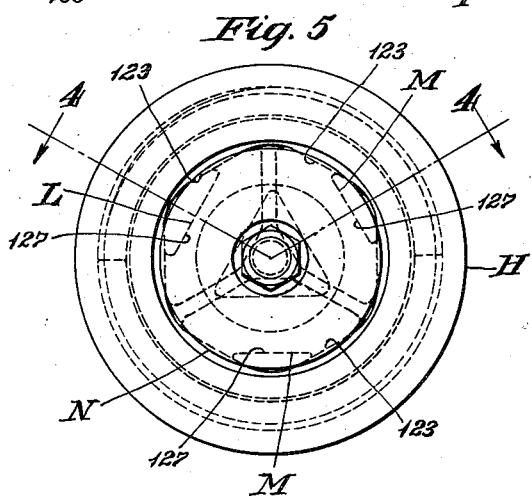
Inventor
Henry B. Loewer
By Henry Fuchs
Atty Patented May 18, 1937

2,080,615

UNITED STATES PATENT OFFICE 2,080,615

FRICTION SHOCK ABSORBING MECHANISM

Henry B. Loewer, Kenmore, N. Y., assignor to W. H. Miner, Inc., Chicago, Ill., a corporation of Delaware Application May 22, 1935, Serial No. 22,682

11 Claims. (Cl. 213—24)

This invention relates to improvements in friction shock absorbing mechanisms especially adapted for railway draft riggings.

One object of the invention is to provide a friction shock absorbing mechanism of relatively high capacity, having preliminary spring action to cushion the lighter buffing and draft shocks of a railway draft rigging, and higher frictional resistance to take care of the heavier shocks.

A more specific object of the invention is to provide a friction shock absorbing mechanism comprising a casing and relatively movable friction shell, and spring resisted friction means cooperating with the shell and friction means, wherein the casing is open at one end and the friction shell and the cooperating friction and spring means are held assembled with the casing by means of a detachable retaining member in the form of a ring, partly closing the front end of the casing and having shouldered engagement with the friction shell to limit outward movement of the latter.

Another object of the invention is to provide a mechanism of the character set forth in the preceding paragraph, wherein the retaining ring is adjustable to place the spring means under the required preliminary compression and maintain the parts of the mechanism assembled and of uniform overall length.

Other objects of the invention will more clearly appear from the description and claims hereinafter following.

In the drawings forming a part of this specification, Figure 1 is a horizontal sectional view through the underframe structure of a railway draft rigging, the section through the friction shell and cooperating elements of the shock absorbing means corresponding to the line 1—1 of Figure 2, said section being on two planes at an angle of 120 degrees to each other. Figure 2 is a front elevational view of the friction shock absorbing mechanism shown in Figure 1. Figure 3 is a vertical sectional view, corresponding substantially to the line 3—3 of Figure 1. Figure 4 is a horizontal sectional view, similar to Figure 1, illustrating another embodiment of the invention, the shock absorbing mechanism only being shown, and the section corresponding to the line 4—4 of Figure 5. Figure 5 is a front elevational view of the mechanism shown in Figure 4.

Referring first to the embodiment of the invention illustrated in Figures 1, 2, and 3, 10—10 indicates channel shaped center or draft sills of the underframe structure of a railway car, and 11—11 stop castings secured to the sills and having front and rear main stop shoulders 12—12 and front and rear intermediate limiting stop shoulders 13—13. The inner end of the coupler shank is indicated by 14 and is operatively connected with a yoke 15 of well-known form. My improved shock absorbing mechanism and the usual front and rear followers 16 and 17 are disposed within the yoke and the yoke is supported by a saddle plate 18 fixed to the bottom flanges of the draft sills.

My improved shock absorbing mechanism, as shown in Figures 1, 2, and 3, comprises broadly, a casing A; a friction shell B; three friction shoes C, D, and D; a wedge block E; spring resistance means F comprising three spring coils; and a two piece retaining ring G.

The casing A is of cylindrical cross section and is closed at the rear end by a vertical wall 19, which bears on the rear follower 17 of the rigging. The casing A is open at the forward end, said open end being interiorly threaded, as indicated at 20. The threaded end of the casing is partly closed by the ring G, which is composed of two curved sections 21 and 22, as clearly shown in Figure 2.

The friction shell B is telescoped within the open end of the casing A and is of substantially cylindrical, exterior cross section. The interior of the shell is of hexagonal cross section, thereby providing three V-shaped friction surfaces 23—23—23 with which the friction shoes C, D, and D cooperate. The friction surfaces 23—23—23 are preferably converged slightly inwardly of the shell. The shell is open at the front and rear ends, as clearly shown in Figure 1, and the rear end portion thereof is enlarged, as indicated at 24, thereby providing an annular stop shoulder 25, which engages with the ring G to limit outward movement of the shell. The forward end of the shell extends through the ring G and beyond the same, the extreme front end thereof being provided with inner and outer, laterally projecting annular flanges 34 and 35 which cooperate respectively with the wedge block E and the front end of the casing A to limit outward movement of the wedge and inward movement of the friction shell B.

The friction shoes C, D, and D, which cooperate with the friction shell are of similar design except as hereinafter pointed out. Each shoe is provided on its exterior with a V-shaped friction surface 26, which cooperates with the corresponding V-shaped friction surface 23 of the friction shell B. On the inner side, at the forward end thereof, each shoe has a wedge face 27 which cooperates with the wedge block E, the wedge face of the shoe C being disposed at a relatively keen wedging angle with respect to the longitudinal axis of the gear, while the wedge faces of the shoes D and D are disposed at relatively blunter angles with respect to said axis. The inner ends of the shoes are flat as clearly shown in Figure 1 and each shoe is provided with a recess 28 at said inner end, the recess of the three shoes together forming an inset spring seat for the innermost spring of the spring resistance F.

The wedge E is in the form of a block having three wedge faces 29—29—29 at the inner end thereof, correspondingly inclined to the wedge faces 27—27—27 of the three shoes C, D, and D, and cooperating therewith. The front end of the wedge block E is substantially flat and bears directly on the inner side of the front follower 16 of the draft rigging. Spaced inwardly from the front end, the block E is provided with an annular, laterally projecting flange 30, which engages in back of the flange 34 of the friction shell B to limit the outward movement of the wedge block E with respect to said friction shell.

The spring resistance means F comprises three coil springs 31, 32, and 33. The coil spring 33, which is disposed outermost, is heavier than the two inner springs and bears at its front and rear ends, respectively, on the inner end of the friction shell B and on the inner side of the rear wall 19 of the casing A. The springs 31 and 32, which are contained within the spring 33, have their opposite ends bearing on the friction shoes C, D, and D and the rear wall 19 of the casing A, the spring 31, which is innermost, having its front end seated in the spring seats 28—28—28 of the shoes.

In assembling the friction shock absorbing mechanism shown in Figures 1, 2, and 3, the three springs 31, 32, and 33, the friction shell B with the friction shoes C, D, and D and the wedge E assembled therewith are inserted within the friction casing A, through the open front end thereof, before the retaining ring G is applied. After the parts have been thus far assembled, they are compressed until the shoulder 25 of the friction shell B is disposed inwardly of the front end of the casing A. While the parts are thus held under compression, the ring G is applied by placing the sections thereof on opposite sides of the friction shell B in back of the flange 35 of the latter and then engaging the threads of the ring with the threads of the casing A. The screw threaded ring G may then be adjusted to place the spring means F under the desired initial compression and maintain the mechanism of the required uniform overall length. As will be seen in the normal full release position of the parts, the friction shell B is held against outward movement by shouldered engagement with the ring G and the wedge block E, in turn, is held against outward movement by shouldered engagement with the interior, annular flange 34 of the shell B.

In the operation of my improved shock absorbing mechanism upon either a buff or draft action being applied to the gear, the followers 16 and 17 will be moved inwardly, relatively to each other, thereby forcing the wedge E inwardly of the casing A. During the first part of the compression stroke, the friction shell B will be moved inwardly with the wedge block E, due to the frictional resistance existing between the friction shoes C, D, and D and the friction surfaces of the friction shell. During this action, the three coils of the spring resistance F will be compressed without movement of the friction shoes with respect to the friction shell B, thereby providing initial spring action during the first part of the compression of the gear. This action will continue until the flange 35 of the friction shell B engages the front end of the casing A, whereupon movement of the shell is arrested, thereby compelling relative movement of the friction shoes and shell during the remainder of the compression stroke. The movement of the friction shoes is resisted by the inner coils 31 and 32 only of the spring resistance means F, the outer coil 33 being inactive during this stage of the compression of the mechanism. Inward movement of the wedge block E and the friction shoes C, D, and D is finally arrested by engagement of the front follower 16 with the front end of the friction shell B, whereupon the springs are relieved from further compression and the force is transmitted through the friction shell B to the casing A, these elements serving as a column load sustaining member. When the actuating force is removed, the spring resistance means F acts to restore the parts to the normal full release position shown in Figure 1, the shell B being limited in its outward movement by engagement with the ring G of the casing A and the wedge being limited in its outward movement by engagement of the shoulder thereof with the flange 34 of the friction shell B.

Referring next to the embodiment of the invention illustrated in Figures 4 and 5, my improved mechanism comprises broadly, a casing H; a friction shell K; friction shoes L, M, and M; a wedge block N; spring resistance means P; a retaining ring R; and a wedge anchoring bolt S.

The casing H is of substantially the same design as the casing A, hereinbefore described, being closed at the rear end by a wall 119 and having the open front end thereof interiorly threaded, as indicated at 120.

The friction shell K, which is telescoped within the casing H, is similar to the friction shell B, hereinbefore described, being of substantially cylindrical, exterior cross section and of hexagonal, interior cross section. On the interior, the friction shell K is provided with three V-shaped friction surfaces 123—123—123, corresponding to the friction surfaces 23, hereinbefore described. The friction surfaces 123—123—123 are converged inwardly of the shell K. At the rear end, the shell K is laterally enlarged and has two annular shoulders 140—141, which cooperate with similarly stepped annular shoulders on the inner side of the retaining ring R. At the forward end, the friction shell K is provided with an exterior, laterally projecting, annular flange 135, similar to the flange 35 of the shell B, hereinbefore described, said flange 135 cooperating with the front end of the casing H to limit inward movement of the shell.

The friction shoes L, M, and M are of similar design to the friction shoes C, D, and D, hereinbefore described, each being provided with an exterior V-shaped friction surface 126, which cooperates with the corresponding friction surface 123 of the shell K, a wedge face 127 on the inner side thereof, which cooperates with one of the wedge faces of the wedge block N, and a flat rear end face, which forms an abutment for two of the coils of the spring resistance means P. The shoes L, M, and M differ from the shoes hereinbefore described in that they are provided with laterally outwardly extending flanges 136—

136—136 at the rear ends thereof which bear on the rear end of the friction shell K. On the inner side, each shoe L, M, and M is provided with a spring seat 128, corresponding to the spring seat 28 hereinbefore described in connection with Figures 1, 2, and 3. The wedge block N, which bears on the front follower of the draft rigging is provided with three wedge faces 128—128—128, which are correspondingly inclined to and cooperate respectively with the three wedge faces of the shoes L, M, and M. The wedge block N is recessed, as indicated at 137, to accommodate the head of the anchoring bolt S and is provided with an opening 142 therethrough adapted to accommodate the shank of the bolt.

The spring resistance means P comprises three coils 131, 132, and 133, the coil 133, which is heavier than the other coils, being outermost and bearing at its front and rear ends, respectively, on the inner ends of the friction shoes and the rear wall 119 of the casing H. The coil spring 132 is disposed within the spring 133 and bears at its front and rear ends, respectively, on the friction shoes and the rear wall of the casing H. The innermost coil 131 of the spring resistance P surrounds the shank of the bolt S.

The anchoring bolt S, which is headed at the rear end, as indicated at 139, has the front end thereof extending into the recess 137 of the wedge block N. At the front end, the bolt S is provided with a nut 143, which has shouldered engagement with the wedge to limit outward movement of the same. A washer 144 is interposed between the head 139 of the bolt S and the rear end of the coil spring 131 and forms an abutment for said spring.

The retaining ring R is made up of two sections which embrace the friction shell K and has threaded engagement with the threads 120 of the casing H.

When the mechanism is assembled, the retaining ring R holds the parts in the position shown in Figure 4, limiting outward movement of the friction shell K. Outward movement of the wedge block N, with respect to the other parts of the mechanism, is limited by the anchoring bolt S, which bears on the spring 131, which, in turn, engages the shoes L, M, and M, the shoes being held against outward movement by shouldered engagement with the shell K. As will be seen upon reference to Figure 4, the inner end of the anchoring bolt S is normally spaced from the rear wall 119 of the casing H, thereby permitting the necessary inward movement of the parts of the gear without projection of the front end of the bolt from the wedge block N.

In the operation of the improved mechanism, as shown in Figures 4 and 5, upon a compression force being applied to the gear, the friction shell K will be forced inwardly of the casing H, together with the wedge block N and the friction shoes L, M, and M, thereby compressing the spring coils 132 and 133. This action continues until the inner end of the anchoring bolt engages the rear wall 119 of the casing H, whereupon the spring 131 will also be compressed. The compression of the springs 131, 132, and 133 will continue until inward movement of the shell K is limited by engagement of the flange 135 thereof with the front end of the casing H, whereupon movement of the shell is arrested and the friction shoes are compelled to move inwardly with respect to the shell. During this last described action, all of the springs of the spring resistance P will be compressed, thereby augmenting the frictional resistance provided by the friction shoes cooperating with the friction shell K. Inward movement of the wedge N is limited when the front follower of the gear engages the front end of the friction shell K, whereupon the force is transmitted through the shell K and the casing H, to the rear follower of the mechanism, these members acting as a solid column to transmit the load and relieve the spring means P of further compression, thereby preventing the springs from being driven solid. In release, the expansive force of the springs will restore the parts to the normal full release position shown in Figure 4.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing open at one end; of a friction shell movable with respect to the casing, said shell having interior friction surfaces; friction shoes engaging the friction surfaces of the shell; a block having wedging engagement with the shoes; spring means within the casing yieldingly opposing inward movement of the shell and shoes; and a retaining ring adjustably secured to said casing for displacement inwardly and outwardly of the same and partly closing the open end of the casing, said ring having shouldered engagement with the shell to limit outward movement thereof.

2. In a friction shock absorbing mechanism, the combination with a casing open at one end; of a friction shell movable with respect to the casing, said shell having interior friction surfaces; friction shoes engaging the friction surfaces of the shell; a wedge block having wedging engagement with the shoes; cooperating shoulders on said block and shell for limiting outward movement of the block; spring means within the casing yieldingly opposing inward movement of the shell and shoes; and an adjustable retaining ring partly closing the open end of the casing, said ring having shouldered engagement with the shell to limit outward movement thereof.

3. In a friction shock absorbing mechanism, the combination with a casing open at one end; of a friction shell movable with respect to the casing, said shell having interior friction surfaces; friction shoes engaging the friction surfaces of the shell; a block having wedging engagement with the shoes; spring means within the casing yieldingly opposing inward movement of the shell and shoes; and a detachable sectional retaining ring adjustably screw threaded within said open end of the casing and partly closing the same, said ring having shouldered engagement with the shell to limit outward movement thereof.

4. In a friction shock absorbing mechanism, the combination with a casing open at one end; of a friction shell movable with respect to the casing, said shell having interior friction surfaces; friction shoes engaging the friction surfaces of the shell; a block having wedging engagement with the shoes; spring means within the casing yieldingly opposing inward movement of the shell and shoes; and a detachable retaining ring screw threaded into the open end of the casing for adjustment lengthwise of the casing, said ring having shouldered engagement with the shell to limit outward movement thereof.

5. In a friction shock absorbing mechanism, the combination with a casing open at one end; of a friction shell movable with respect to the casing, said shell having interior friction surfaces; friction shoes engaging the friction surfaces of the shell; a block having wedging engagement with the shoes; spring means within the casing yieldingly opposing inward movement of the shell and shoes; and a two piece retaining ring screw threaded into the open end of the casing, said retaining ring having shouldered engagement with the shell to limit outward movement thereof.

6. In a friction shock absorbing mechanism, the combination with a casing open at one end; of a ring partly closing said open end; a friction shell telescoped within the open end of the casing, said shell having interior friction surfaces, said shell being in shouldered engagement with the ring to limit outward movement of the shell, said shell also having a portion thereof projecting through said ring outwardly of the casing; friction shoes engaging said friction surfaces of the shell; a wedge block having shouldered engagement with said outwardly extending portion of the shell to limit outward movement of the wedge block, said wedge block being in wedging engagement with the shoes; and spring means yieldingly opposing inward movement of the shoes and shell.

7. In a friction shock absorbing mechanism, the combination with a casing open at one end; of a ring partly closing said open end; a friction shell telescoped within the open end of the casing, said shell having interior friction surfaces, said shell being in shouldered engagement with the ring to limit outward movement of the shell, said shell also having a portion thereof projecting through said ring outwardly of the casing; friction shoes engaging said friction surfaces of the shell; a wedge block having shouldered engagement with said outwardly extending portion of the shell to limit outward movement of the wedge block, said wedge block being in wedging engagement with the shoes; and spring means within the casing including a relatively heavy outer spring member opposing inward movement of the shell and a relatively lighter inner spring member opposing inward movement of the shoes.

8. In a friction shock absorbing mechanism, the combination with a casing open at one end; of a friction shell movable with respect to the casing, said shell having interior friction surfaces; friction shoes engaging the friction surfaces of the shell; a block having wedging engagement with the shoes; spring means yieldingly opposing inward movement of the shell; additional spring means opposing inward movement of the shoes; and stop means adjustably secured to the casing at the open end thereof for displacement lengthwise of the casing and having shouldered engagement with the shell to limit outward movement thereof.

9. In a friction shock absorbing mechanism, the combination with a casing open at one end; of a friction shell movable with respect to the casing, said shell having interior friction surfaces; adjustable stop means on the casing engaging the shell for adjusting the limit of outward movement of the shell, said stop means being adjustable lengthwise of the casing; friction shoes engaging the friction surfaces of the shell, said shoes having shouldered engagement with the shell to limit outward movement of the shoes with respect to the shell; a block having wedging engagement with the shoes; spring means within the casing yieldingly opposing inward movement of the shell and shoes; an anchoring bolt anchored to the wedge; and spring means opposing relative movement of the bolt and shoes.

10. In a friction shock absorbing mechanism, the combination with a casing open at one end; of a friction shell movable with respect to the casing, said shell having interior friction surfaces; stop means on said casing having shouldered engagement with the shell, said stop means being adjustable lengthwise of the casing to adjust the limit of outward movement of said shell; friction shoes engaging the friction surfaces of the shell, said shoes having shouldered engagement with the shell to limit outward movement of the shoes with respect to the shell; a block having wedging engagement with the shoes; spring means within the casing yieldingly opposing inward movement of the shell and shoes; an additional spring bearing at its front end on the shoes; a bolt anchored at one end to the wedge and having spring abutment means at the other end, said spring abutment means bearing on said additional spring only and engaging the rear end thereof.

11. In a friction shock absorbing mechanism, the combination with a casing open at one end; of a friction shell telescoped within the open end of the casing, said shell having interior friction surfaces; friction shoes within the shell having frictional engagement with the friction surfaces thereof, said shoes having shouldered engagement with the rear end of the shell; a wedge block having wedging engagement with the shoes; and spring means within the casing bearing on the shoes and yieldingly holding the shoes in shouldered engagement with the shell.

HENRY B. LOEWER.